United States Patent
Gonthier (10) Patent No.: US 6,836,599 B2
(45) Date of Patent: Dec. 28, 2004

(54) ALL-FIBER MACH-ZEHNDER INTERFEROMETER AND METHOD OF MAKING THE SAME

(75) Inventor: François Gonthier, Montreal (CA)

(73) Assignees: ITF Technologies Optiques Inc., Montreal (CA); ITF Optical Technologies Inc., Montreal (CA)

(*) Notice: Subject to any disclaimer, the term of this patent is extended or adjusted under 35 U.S.C. 154(b) by 183 days.

(21) Appl. No.: 10/220,521

(22) PCT Filed: Mar. 6, 2001

(86) PCT No.: PCT/CA01/00286

§ 371 (c)(1),
(2), (4) Date: Sep. 3, 2002

(87) PCT Pub. No.: WO01/69292

PCT Pub. Date: Sep. 20, 2001

(65) Prior Publication Data

US 2003/0048991 A1 Mar. 13, 2003

(30) Foreign Application Priority Data

Mar. 16, 2000 (CA) .............................................. 2300750

(51) Int. Cl.$^7$ ................................................. G02B 6/26
(52) U.S. Cl. .............................. 385/43; 385/42; 385/14
(58) Field of Search ............................. 285/42, 43, 51, 285/48, 14, 15

(56) References Cited

U.S. PATENT DOCUMENTS

| 4,725,141 A | * | 2/1988 | Georgiou et al. ............ 356/477 |
| 5,044,715 A | | 9/1991 | Kawachi et al. .............. 385/42 |
| 5,119,453 A | | 6/1992 | Gonthier et al. .............. 385/43 |
| 5,361,157 A | * | 11/1994 | Ishikawa et al. ............. 398/168 |
| 5,719,971 A | | 2/1998 | Smith .......................... 385/17 |
| 6,031,948 A | | 2/2000 | Chen ........................... 385/24 |

FOREIGN PATENT DOCUMENTS

| CA | 2289962 | 5/2001 | .......... G02B/6/255 |
| WO | WO9804942 | 2/1998 | .......... G02B/6/34 |
| WO | WO9964898 | 12/1999 | |

* cited by examiner

Primary Examiner—Diane I. Lee
(74) Attorney, Agent, or Firm—George J. Primak (57) ABSTRACT

An all-fiber Mach-Zehnder interferometer has a central fiber structure in which two single-mode fibers are placed to have a desired path difference and are stabilized in such position by bonding them in certain spots. A coupler is then made on each side of the central fiber structure to produce the Mach-Zehnder effect. The combination of the central fiber structure and of the couplers at each end is mounted on a substrate and packaged to produce the interferometer.

18 Claims, 6 Drawing Sheets

ALL-FIBER MACH-ZEHNDER INTERFEROMETER AND METHOD OF MAKING THE SAME

FIELD OF THE INVENTION

This invention relates to all-fiber Mach-Zehnder interferometers and a method of making the same. More particularly, the invention relates to single-mode, fused optical fiber couplers that are concatenated to produce interferometric paths between the couplers, thereby resulting in a Mach-Zehnder structure. The invention also includes mechanical stabilization of such structure and its packaging.

BACKGROUND OF THE INVENTION

All-fiber Mach-Zehnder interferometers generally comprise two fiber optic couplers fused in series on two parallel single-mode optical fibers. This basic structure is well described in the literature and in patents, such as U.S. Pat. Nos. 5,044,715 and 5,119,453. The all-fiber Mach-Zehnder appellation derives from the analogy between the classical two-path Mach-Zehnder interferometer and the fiber structure. A classical Mach-Zehnder interferometer is composed of two beam splitters and mirrors. A first beam splitter is used to split an input collimated light beam into two beams of equal intensity. These two beams are then redirected with mirrors at 45° incidence on opposite sides of the second beam splitter, so that the reflexion of any one of the two beams will exactly coincide with the transmitted portion of the other beam. Because of this coincidence, the two beams interfere constructively or destructively at the output beam splitter, depending on the phase difference between the amplitude of the light in the two beams. This phase difference depends on the optical path length difference in the two beams, and the Mach-Zehnder output power in one beam is a sine square function of the phase difference and a complementary cosine square for the second output beam. If the beam splitters are exactly 50%, then the power transfer from one beam to the other is 100%. This is called the Mach-Zehnder effect.

In the all-fiber version, fused couplers are equivalent to beam splitters. The two paths correspond to the optical fibers between the couplers and the two output ports of the second coupler correspond to the two output beams. The fused couplers are made by laterally fusing two single-mode optical fibers together by applying a heat source on two optical fibers which are longitudinally in contact. The heated structure is then pulled, creating a bi-tapered structure. In this tapering, the light escapes the single-mode core, which becomes too small to guide the light and excites a superposition of two cladding modes, one symmetric and the other asymmetric. These modes have different propagation constants and will accumulate a phase difference. Because of the transverse modal intensity profile, the total transverse optical field, resulting from the interference between the two modes, will show a concentration of power varying with the phase difference between the two modes that will shift from one side of the fused fiber structure to the other. At the output taper of the coupler, this power distribution will result in the coupling of the output power in one fiber or the other, thus creating an exchange of power between the two output fibers. The ratio of power transferred is called the coupling ratio and because of the symmetry of the coupler, this ratio can vary from 0 to 100%, 50% or 3 dB being the case where the power split between the fibers is equal. In a Mach-Zehnder structure this is used to split light between two fibers, and then recombine and interfere the light at the output. This interference will depend on the optical path difference in the lengths of the two fibers between the two couplers.

U.S. Pat. No. 5,119,453 describes a Mach-Zehnder interferometer with small path differences. However, Mach-Zehnder interferometers with large path differences can also be made and have applications such as multiplexing and demultiplexing wavelengths onto and from a single-mode fiber. In these applications, the Mach-Zehnder structure transmission varies sinusoidally with wavelength, with a maximum amplitude. Depending on the wavelength, the power can output completely in one or the other of the output fibers.

The principle of an all-fiber Mach-Zehnder interferometer is fairly straightforward for one versed in the art, but as an interferometer, the Mach-Zehnder is very sensitive to any perturbation in its structure, such as mechanical changes or temperature changes. Furthermore, the greater the path difference, the smaller the wavelength period, thus making the selectivity of the wavelength response sharper, but at the same time the structure becomes more sensitive to outside environmental influences. The latter will cause the Mach-Zehnder sinusoidal wavelength response to shift, rendering the structure very good for sensing applications, but unusable in reliable wavelength multiplexing and demultiplexing applications. The difficulty in creating a satisfactory Mach-Zehnder structure thus resides both in the fabrication and in the packaging of the structure.

In dense wavelength multiplexing or demultiplexing applications, great care must be taken to achieve wavelength accuracy in the spectral response of the Mach-Zehnder with the maximum contrast. The couplers must be accurately fabricated to obtain a 50% coupling ratio at the middle wavelength in the wavelength range of operation, to insure the largest contrast possible and the fiber length difference between the couplers must be accurately controlled to insure the correct spectral response. Both these characteristics are difficult to achieve simultaneously.

As an example, one can easily fabricate two 3 dB fused couplers with exactly the correct spectral properties, and subsequently by fusing splice the output fibers of the first coupler to the input fibers of the second coupler. In such a case, however, it is extremely difficult to obtain the correct length difference which must be controlled within a micron to achieve the appropriate spectral response. Furthermore, splicing requires fiber length and the longer the fibers between the couplers, the more sensitive the structure is to external environmental factors such as temperature and vibrations. There is thus a need to produce all-fiber Mach-Zehnder interferometers that would obviate these disadvantages.

OBJECTS AND SUMMARY OF THE INVENTION

It is an object of the present invention to fabricate improved all-fiber Mach-Zehnder interferometers that obviate the disadvantages mentioned above.

Another object of the invention is to provide smaller and mechanically more stable Mach-Zehnder structures.

A still further object of the invention is to achieve better control in the fabrication and packaging of all-fiber Mach-Zehnder devices.

Other objects and advantages of the invention will become apparent from the following descriptions thereof.

In essence, the present invention provides an all-fiber Mach-Zehnder interferometer that comprises two fiber optic couplers made in series by fusing and tapering two parallel single-mode fibers and a central fiber structure between the two fiber optic couplers, said central fiber structure having two fibers of a shape that produces a predetermined path difference required for achieving a desired Mach-Zehnder effect, and is characterized in that the fibers of said central fiber structure are bonded in predetermined spots so as to stabilize the central fiber structure within the interferometer.

Thus, the invention involves creating a fiber structure by bonding two single-mode optical fibers in a given shape adapted to produce a predetermined optical path difference, and thereafter making two fused fiber optic couplers on the input and output fibers of such central fiber structure, so as to produce an all-fiber Mach-Zehnder interferometer. The two single-mode optical fibers may be bonded to each other or to other supporting fibers or to a substrate in order to retain the given shape of the central fiber structure unmodified, while the couplers are made and thereafter while the interferometer is packaged. Also, the central fiber structure is preferably so created that the input and output fibers coming out of the structure are parallel to each other and can easily be placed in longitudinal contact with each other so that they may be fused together and couplers may then be made in the fused sections by pulling and tapering the same.

Once the shape of the central fiber structure has been determined, the fibers can be formed into such shape by physical or mechanical means and bonded in such shape to a substrate. The two couplers can be made subsequently at the input and output ends of the central fiber structure, to form the Mach-Zehnder interferometer. The packaging of the couplers can then be completed on another substrate. However, it should be mentioned that if the central fiber structure is maintained on a different substrate than the couplers, this may result in some instability of the Mach-Zehnder interferometer and it is, therefore, preferable to place the entire interferometer arrangement including the central fiber structure and the couplers on a single substrate. Thus, the present invention also provides for bonding the Mach-Zehnder couplers to the same substrate that holds the fiber structure. This, however, requires that the couplers be made with the substrate already in place, which means that the fusing and tapering of the coupling regions must be carried out close to the substrate. This can be facilitated by designing the substrate so that it has notches or similar cavities in the area where the fibers are to be fused and tapered.

Moreover, in order to avoid the use of two substrates or a specially designed substrate, a further embodiment of the present invention provides for not using any substrate at all to hold the central fiber structure or the couplers prior to mounting the entire combination onto a packaging substrate. This is achieved by aligning the input fibers and the output fibers coming out of the central fiber structure approximately on the same axis. By so doing, the fabrication process of the couplers becomes more accurate and the packaging of the Mach-Zehnder interferometer becomes straight forward since everything is aligned on the same axis, making the packaging of the interferometer as simple as that of individual couplers. When everything is so aligned the couplers and the central fiber structure stabilized in accordance with the present invention can be held suspended in air in an approximately straight line, just by holding the input and output fibers at each end. A substrate is then approached to this overall arrangement suspended in the air and the entire Mach-Zehnder device is bonded thereto. In this manner, the couplers and the fiber structure can be bonded on a single substrate, which can then be packaged in a tube. The packaging can be done so that the input fibers of the Mach-Zehnder interferometer exit from one end of the tube and the output fibers from the other end of the tube.

For balanced or quasi-balanced Mach-Zehnder interferometers, keeping the two couplers on the same axis when forming the central fiber structure, is fairly straightforward. With only a few microns path difference, the two fibers of the structure are almost parallel in such cases. The natural shape of a structure composed of two fibers of different lengths, placed on the same geometric plane, is a crescent, where the shorter fiber forms the inner circular arc and the longer fiber forms the outer circular arc. These arcs are not perfectly circular because to make a coupler the fibers at the extremities of the crescent must be tangent. It is a feature of the present invention to bond the fibers at the points where they are tangent to each other, and the bond points can be between the fibers themselves without involving a substrate. For such structures, this is usually sufficient to provide the required mechanical stability.

When the path difference is very small, the crescent produced has a closed shape. If, under such conditions, the shorter fiber is pulled to a straight line position, the longer fiber will take the form of a bump in the linear arrangement of the two fibers, in order to maintain the same path difference. Such bump is not a natural shape of the fiber structure and, due to the mechanical rigidity of the fiber, some force must be exerted to maintain this unnatural shape of a bump in the fiber. For a small path difference, the force to be exerted is rather small and thus the pulling force exerted to make the couplers would normally be sufficient to keep the structure straight enough to make the Mach-Zehnder interferometer as this is disclosed in U.S. Pat. No. 5,044,715. Consequently, under these circumstances it is possible to make the couplers one after the other, after the fiber structure has been produced. This is suitable for very small path differences of few microns or few tents of microns, because the straightness of the fibers can be naturally maintained in such fibers.

However, for dense WDM multiplexers the path difference is usually several hundred microns and for very dense WDM multiplexers it is usually a few millimeters. In such cases it becomes much more difficult to control the plane of the bumps of the fiber, because the bump shape exerts a far stronger force. To satisfy the requirements of such dense multiplexers, a further embodiment of the present invention provides for positioning the long fiber within the central fiber structure in the form of an S that crosses the shorter fiber in the middle. The fibers are then bonded at the output tangent points and in the middle crosspoint. This produces a mechanically stable structure and greatly reduces any twisting of the S shape with reference to the plane of the output fibers. Due to this stability, the fiber structure can be easily manipulated so that the Mach-Zehnder couplers can be made on approximately the same axis. Furthermore, it is preferable to further bond the fibers at each output end of the central fiber structure, at points slightly further away from the primary bond points, after forcing the fiber into an accurate shape, so that the output transverse plane of the fibers is rotated a given angle. In a further embodiment, it is preferable to make the transverse planes at both output extremities parallel to each other and furthermore to have them parallel and on the same axis. This technique of parallel planes at both output extremities is particularly useful for very large path differences, to correct the angle and alignment that a simple S-shape cannot correct.

The S-shape of the fiber structure also addresses another problem which is the problem of sensitivity of the interferometer to vibration. One of the well known problems of a Mach-Zehnder structure is that if one of the fibers is under tension and the other is not, the all-fiber interferometer becomes sensitive to vibration or acoustic waves, making it unusable as a stable WDM device. This is the case of the bump-shape structure where the short fiber is held in a straight position. However, in the case of the S-shape structure, the two fibers are connected not only at the extremities, but also in the middle, making them less susceptible to different acoustic waves and to vibration. Furthermore, using the S-shape, the structure can be compressed and, being under very little external tension, it will keep its shape due to its internal tension and will not be sensitive to small acoustic perturbations. Thus, the S-shape structure can be bonded to a substrate under little tension or compression, making it acoustically insensitive.

The formation of the S-shape structure can be accomplished in several ways. For example, this can be done by applying approximate mechanical holders to the fibers and, while the fibers are held in place, applying bonding points in one or several steps. Also, a mold can be used that holds the fibers in an S-shape configuration while the bond points are applied. It is also possible to bond the fiber structure to the mold itself which would then act as a supporting substrate.

The present invention is not limited to the specific shapes of the structure mentioned above, such as the bump-shape or the S-shape, but covers any shape that will have the desired stability and a predetermined optical path difference. Any suitable method for achieving such structure is included within the scope of this invention. For example, the fibers need not be fully stripped of their protective jacket when the fiber structure is made; they can be stripped only at the bond points of the fiber suture. Also, it is possible to remove the protective polymer jacket from the fiber structure only after fabrication of the couplers; the protective jacket is not mechanically stable and, if left, may cause the interferometer to vary unpredictably as environmental parameters change. The Mach-Zehnder couplers can be bonded to separate substrates before bonding the whole structure to a final substrate.

BRIEF DESCRIPTION OF THE DRAWINGS

A preferred embodiment of the invention will now be described with reference to the appended drawings in which.

DETAILED DESCRIPTION OF THE INVENTION

A preferred embodiment of the invention will now be described with reference to the accompanying drawings in which the same elements are designated by the same reference numbers.

Figure 1:
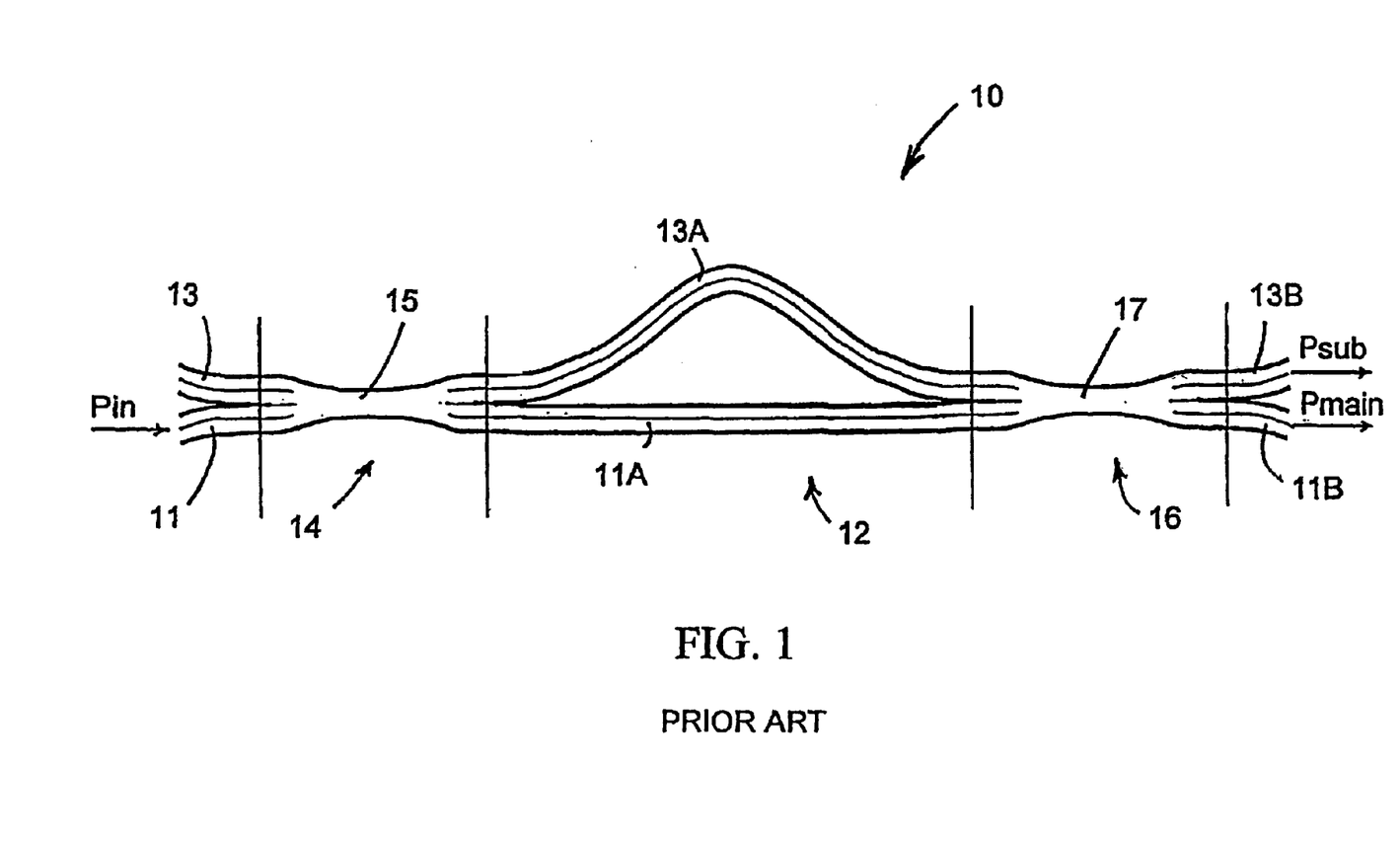
FIG. 1 is an enlarged diagrammatic illustration of an all fiber interferometer structure as known in prior art.

In FIG. 1 there is shown a known type of all-fiber Mach-Zehnder interferometer 10, which is composed of three sections 12, 14 and 16. Two input fibers 11 and 13 enter a first coupler 15 located in section 14 of the interferometer. This coupler splits the power Pin between the two fibers in the central section 12 of the interferometer. In this middle section 12, the two fibers 11A and 13A are of different lengths, since this is an unbalanced Mach-Zehnder interferometer. Thus, fiber 11A is straight and fiber 13 is in the form of a bump or semi-circle in this fiber structure arrangement, which produces the desired phase difference. These fibers 11A and 13A are connected to a second coupler 17 in the third section 16 of the interferometer which is the output coupler and which leads to two output fibers 11B, 13B which constitute the main output port emitting a main optical signal Pmain and sub-output port emitting a sub-optical signal Psub. Such an interferometer is disclosed in U.S. Pat. No. 5,044,715. As indicated in that patent, however, such structure is suitable only when there is a slight difference in the optical path length of the fibers 11A and 13A, because with a larger such difference the device would become mechanically unstable. On the other hand, in dense WDM applications, the Mach-Zehnder fiber structures are greatly unbalanced with length difference of several hundreds of microns, which makes the structure shown in FIG. 1 unsuitable for such applications.

As already previously mentioned, the main object of the present invention is to fabricate all-fiber Mach-Zehnder interferometers which are mechanically stable and can be easily packaged and which can be used for any application. The central fiber structure of such interferometers, located between the two couplers, may have various shapes, such as a crescent, a bump, an S-shape, a double S-shape or the like, in which one fiber is shorter than the other and in which the desired optical path difference between the two fibers is achieved. This is done by providing bond points within the fiber structure between the two couplers, which bond the fibers in order to stabilize them and maintain the proper path difference. The bond points may be produced using epoxy glue or any other suitable adhesive. The stabilization of the all fiber Mach-Zehnder interferometer using bond points in the fiber structure between the two couplers is a novel concept which to applicants knowledge is unknown in the prior art and which produces considerable overall improvements in the Mach-Zehnder device.

FIGS. 2A–2G show various arrangements of all-fiber Mach-Zehnder interferometers that can be produced in accordance with the present invention.

Figure 2A:
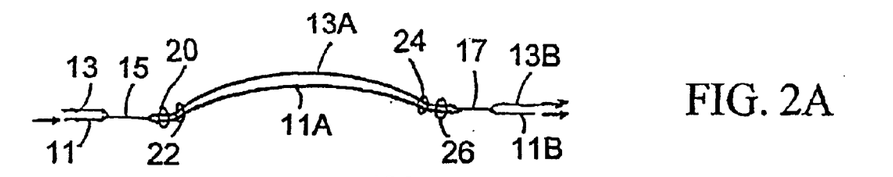
FIGS. 2A to 2G illustrate various configurations of interferometer structures with bonds provided in accordance with the present invention to stabilize such structures.

In FIG. 2A there is shown a crescent shaped interferometer in which the arcs of the two fibers 11A and 13A are very open. The input fibers in this device are 11 and 13 and the output fibers are 11B and 13B. The two Mach-Zehnder couplers 15 and 17 are located on each side of the central fiber structure having crescent shaped accurate fibers 11A and 13A. According to the invention, these fibers 11A and 13A are mechanically stabilized and held in their proper position by bonding them with bond points 20, 22 and 24, 26.

Figure 2B:
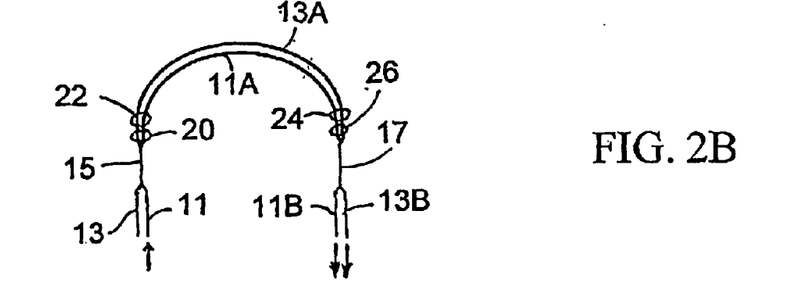

FIG. 2B illustrates a somewhat different crescent arrangement where the crescent-shape of fibers 11A and 13A is much more closed. This arrangement is not carried out on the same general longitudinal axis as in the case of FIG. 2A but rather the input fibers 11 and 13 and 11B and 13B are on separate parallel axes on each side of the fiber structure provided by fibers 11A and 13A. Couplers 15 and 17 are also on the same axes as the input and output fibers respectively. Again in this case the fibers 11A and 13A of the fiber structure are maintained in their configuration and made mechanically stable by bond points 20, 22 and 24, 26 at each end of the fiber structure.

Figure 2C:
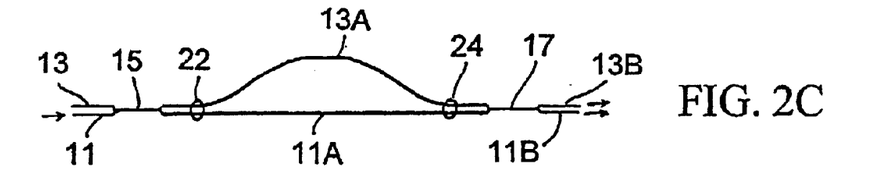

FIG. 2C illustrates a bump-shape design such as shown in FIG. 1. The mechanical stability of this design is improved by bonding fibers 11A and 13A at each end with bond points 22 and 24. Because this is a simple configuration, one bond point at each end is sufficient to stabilize the central fiber structure between couplers 15 and 17.

Figure 2D:
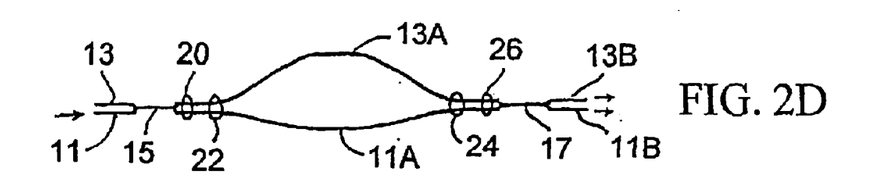

FIG. 2D is similar to FIG. 2C but has a greater path length difference between fibers 11A and 13A of the central fiber structure. In this case, fiber 11A is not straight as in FIG. 2C, but is somewhat spread out. This configuration produces more tension and thus, in order to provide good mechanical stability, two bond points 20, 22 and 24, 26 are used at each end of the central fiber structure between couplers 15 and 17 to stabilize such structure.

Figure 2E:
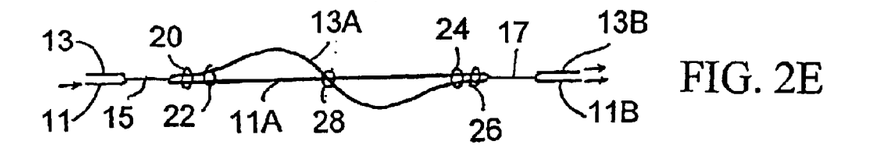

FIG. 2E illustrates a fairly pronounced S-shape configuration of fiber 13A in association with a straight fiber 11A to form the fiber structure between couplers 15 and 17 In this case, to achieve a mechanically stable structure, fibers 11A and 13A are bonded at bond points 20, 22 and 24, 26 at each end of the structure and also in the middle at bond point 28 where the fibers cross.

Figure 2F:
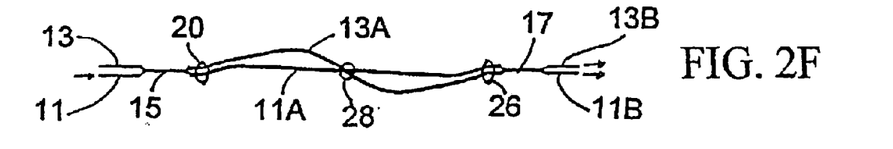

FIG. 2F shows an S-shape configuration of the central fiber structure similar to FIG. 2E, but less pronounced. It has, therefore, less tension between fibers 11A and 13A and in order to provide mechanical stability for this fiber structure, three bond points 20, 26 and 28 are sufficient. Bond points 20 and 26 are at each end of the structure and bond point 28 in the middle where the fibers cross.

Figure 2G:
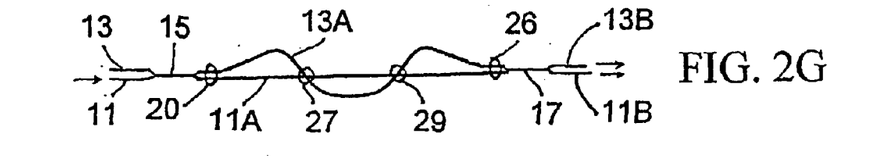

FIG. 2G shows another design of the central fiber structure having a double S-shaped configuration. In this case four bond points are provided two at each end, namely 20 and 26, and two at the cross-points of fiber 13A with fiber 11A, namely 27 and 29. This provides a satisfactory mechanical stability despite a considerable difference in length between fibers 11A and 13A in the central fiber structure.

When designing the central fiber structure, one has to take into account several parameters. First, at least one of the optical fibers is bent. Optical fibers are flexible but the bending radius they can allow depends on their diameter. This radius is limited either by reliability or by bending loss. As an example, the fiber used herein to build the Mach-Zehnder interferometer was a 9 $\mu$m core/125 $\mu$m diameter cladding single-mode optical fiber manufactured by Corning. The cutoff wavelength of the second mode is 1200 nm. It is proof tested at 100 kpsi, and Corning specifies a 25 mm minimum bending radius. At high proof testing levels (200 or 400 kpsi), the fiber can reliably be used at smaller radii. Fibers with smaller diameter (e.g. 80 $\mu$m or smaller) have even smaller bending radii than the 125 $\mu$m fiber. The limiting factor then becomes bending loss. For the above mentioned 125 $\mu$m single-mode Corning fiber, bending loss is negligible at 1550 nm wavelength for a radius above 16 mm. Furthermore, if the length of the bend is very small, e.g. 1 mm, a smaller bending radius can be used with negligible loss.

The other effect of bending is that, because of the fiber's rigidity, the bent fiber will induce some force on whatever holds it in the bent position. This means that the structure has to be restrained in some way to keep its shape.

Lastly, bending also has some effect on the birefringence of the fiber, which will be increased as the bend radius becomes smaller.

There are a few critical properties of the three Mach-Zehnder components that will limit their optical performance. The insertion loss of the different components, their polarization dependent loss, their birefringence and their spectral dependence. For optimal performance, the coupling ratio of the couplers should be 50% with minimal insertion loss (below 0.1 dB). However, fused couplers have a wavelength dependence with dependence on their length and longitudinal profile. One can minimize the length dependence of the coupler by elongating it to its first 50% coupling ratio point, namely the point which is centered in the wavelength window of operation of the Mach-Zehnder. This can be achieved for example by the method disclosed in applicant's Canadian Patent Application No. 2,289,962. This point also has very small polarization dependent loss PDL values (e.g. 0.03 dB). For the central fiber structure, insertion loss should be minimal and, in particular, differential excess loss in the two fibers should be essentially negligible. Any difference will limit the contrast of the interferometer. Furthermore, any polarization rotation within this structure will also reduce the contrast. This loss and birefringence are negligible in the fiber if the bending radius is not too small.

The above mentioned features should be taken into account when manufacturing the all-fiber Mach-Zehnder interferometers in accordance with the present invention, however, they do not limit the scope of the invention or are unique to the solution presented herein.

Figure 3:
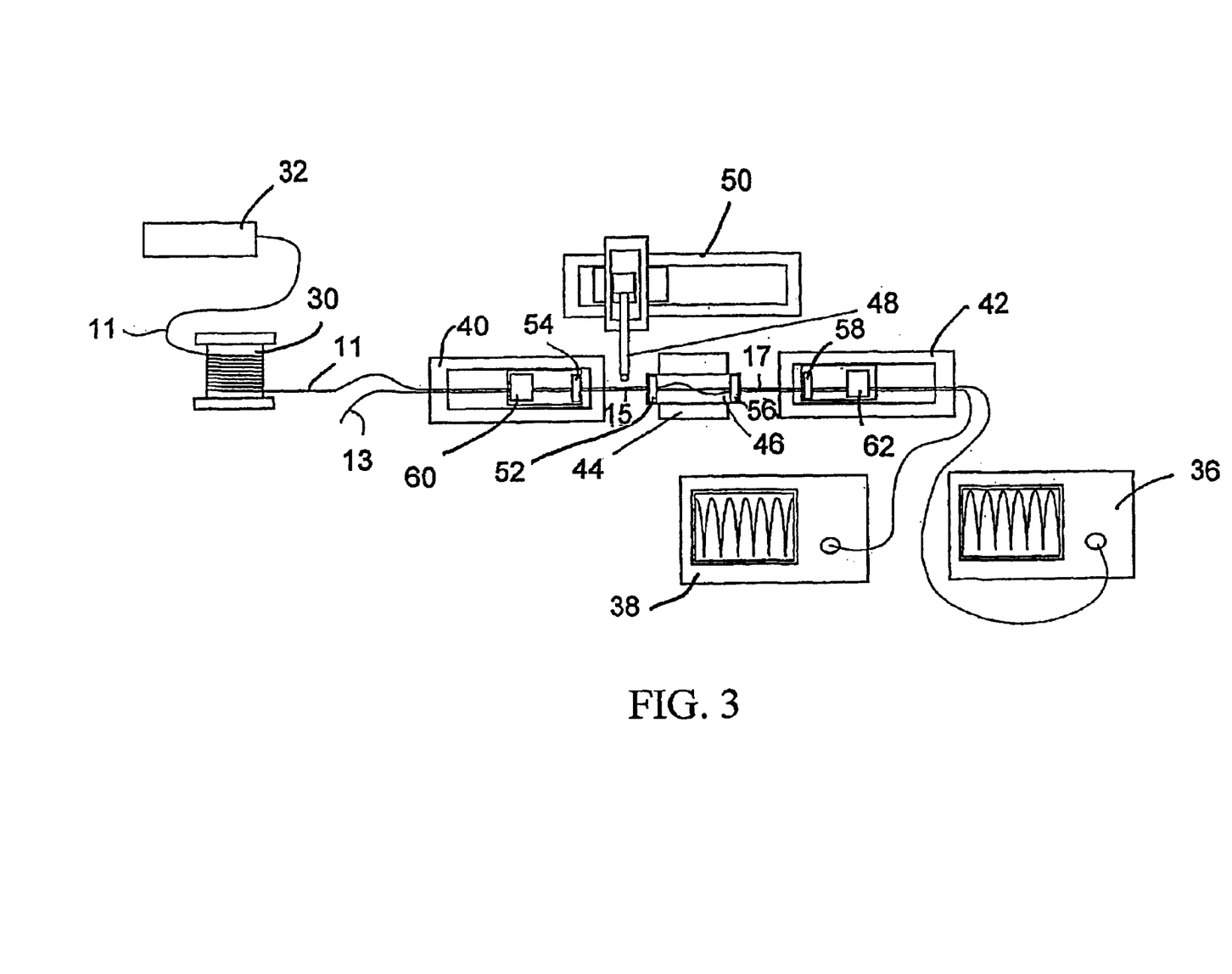
FIG. 3 is a diagrammatic view of a fabrication set-up that can be used for the purposes of the present invention.

FIG. 3 illustrates a fabrication setup suitable for the purposes of the present invention. It was used to fabricate an all-fiber Mach-Zehnder interferometer which is linear, i.e. where the two couplers are aligned approximately on the same axis. This allows easy packaging of the overall Mach-Zehnder structure in a tube. The Mach-Zehnder produced was a 100 GHz channel spacing multiplexer optimized to multiplex two series of 20 channels, each series being 200 GHz spacing comb of wavelengths from 1531.90 nm to 1561.41 nm for the first series and from 1531.5 nm to 1562.23 nm for the second series. This means the period of the Mach-Zehnder had to be 200 GHz. To make such multiplexer, as shown in FIG. 3, a spool 30 or a long length of optical fiber 11 is spliced to a broadband optical source 32 such as an ASE noise source made with erbium doped fiber, or simply an ELED. The source is not polarized. At the other end of the spool 30, fiber 11 is spliced to an optical spectrum analyzer 36 and a reference trace is taken over a span of 40 nm centered on 1546 nm. The fiber is then cut about 4 m away from the splice and the separate fiber 13 thus produced is connected to a second spectrum analyzer 38 where the second reference trace is taken. The Mach-Zehnder is made about 2 m from the splice on the side of the spectrum analyzers 36 and 38. For this purpose the optical fibers 11 and 13 are placed on the setup having two motorized stages 40, 42 capable to pull the optical fibers on either side. In the middle, between the stages 40 and 42 stands a holding tower 44 that has the function to hold the unbalanced fibers in the middle section in a predetermined position, for example in a mold 46 placed on the tower 44. The setup also comprises a heat source which, in this case, is a micro-torch 48 mounted on a motorized stage 50 designed so that the micro-torch can approach and sequentially heat couplers 15 and 17 while they are pulled by stages 40, 42 to produce the Mach-Zehnder effect. At each coupling section, just outside of the coupler fusion area, there are provided fiber alignment blocks 52, 54 and 56, 58 which are adapted to keep the fibers aligned and in contact with each other so the coupling fusions can be properly performed. Then, outside these blocks, there are provided fiber clamps 60, 62 to hold the fibers under tension as the motorized travelling stages 40, 42 pull on the couplers to make the tapered sections.

Figure 4:
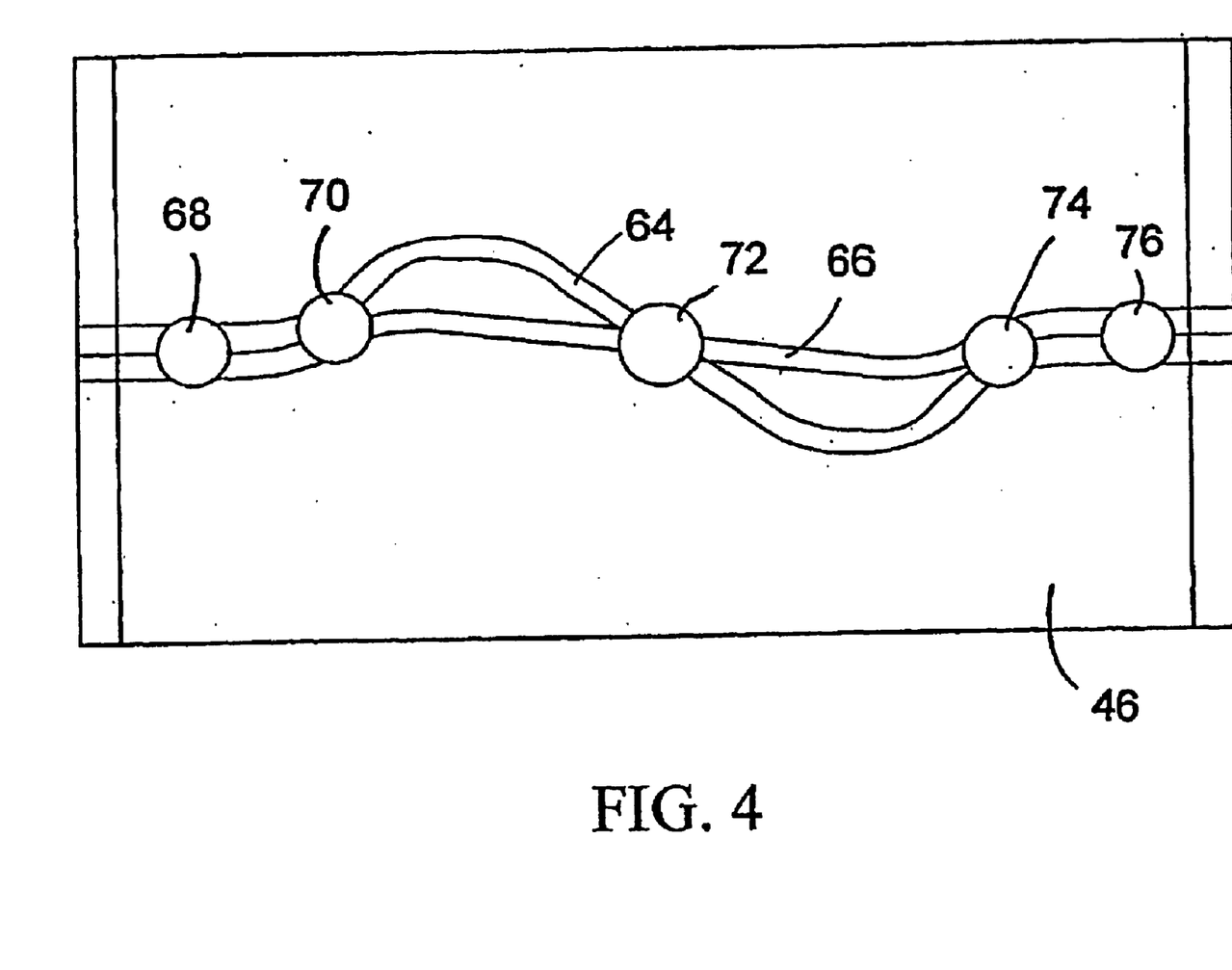
FIG. 4 illustrates a detail of a holding mold used for the purposes of producing the desired shape of the fiber structure in accordance with the present invention.

FIG. 4 illustrates in greater detail the mold 46 positioned on the central tower 44 shown in FIG. 3. Two groves 64, 66 are machined in the block of mold 46 so that fibers can be laid therein in a desired shape. In the present instance an S-shape is chosen, which allows the two fibers to exit at both output sides on the same axis. The path difference in the S-shape fiber structure has been precalculated, even taking into account the 3-D aspect of the shape of channels 64 and 66, since the fibers cross each other in the middle. Furthermore, five holes 68, 70, 72, 74, 76 are made in the substrate of mold 46, which allow a bonding material, such as epoxy glue, to be placed between the crossing or adjacent fibers to bond them with one another. Instead of five bond points, only three could sometimes be used, however, because the path difference which needs to be achieved for a 100 GHz—channel spacing is approximately 1.07 mm, the S-shape is too pronounced to exit properly using only three bond points for the length of the S that was chosen, namely 50 mm. Thus, five bond points were provided. The groves 64, 66 in the holding mold 46 are wide enough to hold a jacketed fiber having a diameter of approximately 250 $\mu$m. Because the fiber is bent, care must be taken not to damage it while it is inserted and held in the S-shaped grove, to avoid breakage. Thus, it is preferable to strip the jackets of the fibers only where couplers 15, 17 are made and in the central section where the bond points are applied, which in FIGS. 2A to 2G are shown as bond points 20, 22, 24, 26, 27, 28 and 29. After proper cleaning, the fibers are placed in a mold, such as the S-holder 46 and clamped in place. On each side of the central section, the fibers are extended under the external clamps 60, 62 of the travelling stages 40, 42 as shown in FIG. 3. The alignment blocks 52, 54 and 56, 58 are then inserted to hold the fibers in contact with each other over the lengths they are fused to make the couplers. When the two fibers are placed in the groves 64, 66, it is important that equal tension be applied to both fibers. The bond points on the S-shape can be cured before or after the procedure of making the couplers 15, 17, so long as the holding block 46 stays firmly in place. In fact the whole fabrication of the S-shape (or other desired shape) can be made prior to connecting the fibers to the optical setup.

Referring again to FIG. 3, once the fibers are well clamped and aligned, the heat source, namely the microtorch 48 is approached to fabricate the first coupler 15. Using this micro-torch, the fibers are fused in one of the two coupling regions. They are typically fused over 2 to 4 mm. The travelling stage 40 is moved away from the center, thus pulling the heated fibers. While pulling, the power is monitored on both OSAs 36, 38 and the pulling is stopped when the power is essentially equal in both channels at 1546 nm, i.e. the coupling ratio is 0.5. The heat source 48 is then removed, after which the coupling ratio changes, because the heat changes the refractive index of silica sufficiently to change the phase in the coupler. However, this change is reproducible, so that proper stop criteria can be determined to obtain the desired final coupling ratio. Other techniques can be used to achieve the exact desired coupling ratio, such as for example disclosed in applicant's Canadian Patent Application No. 2,289,962.

Figure 5:
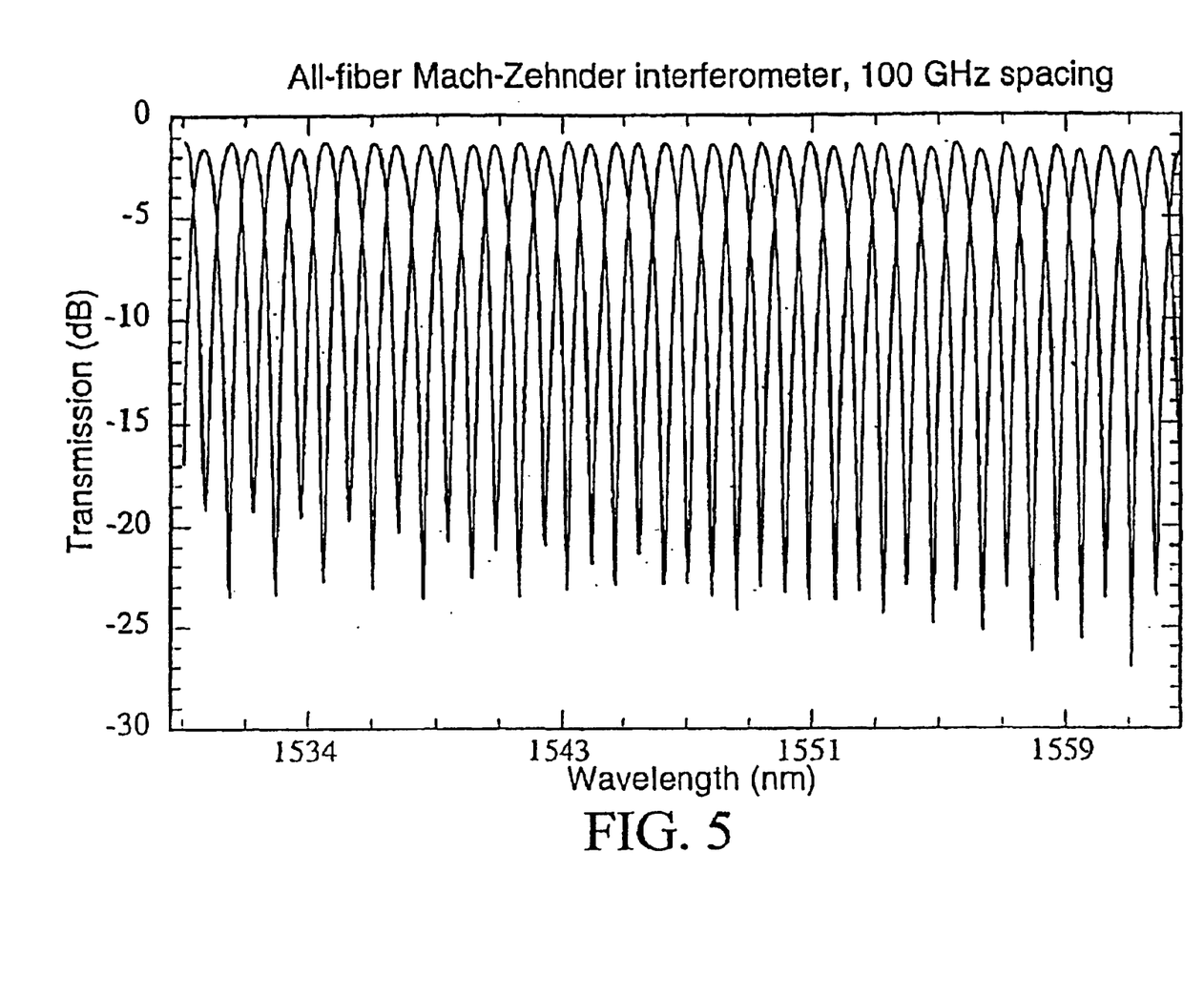
FIG. 5 is a graph showing the wavelength response of an all-fiber Mach-Zehnder interferometer in accordance with the present invention.

After the first coupler 15 is made, the heat source 48 is approached to the second coupling region and the fusion and pulling process is repeated to make coupler 17. The stoppage criteria for this second coupler 17 is not the same as that for the first coupler 15, because the monitoring here is to produce a Mach-Zehnder effect. For the second coupler 17, one can use the length criteria, i.e. stop after a predetermined length and measure the properties of the Mach-Zehnder. The most precise method, however, is to look at the isolation of the Mach-Zehnder contrast. As the second coupler 17 starts coupling the power in between the fibers, the interference will appear and the sine-like response will appear on both OSAs 36 and 38, each being out of phase with the other. The maximum contrast is reached when both couplers are identical, which is the condition that one looks for in the interferometer. However, because the couplers have a wavelength response, the contrast will not be uniform in the wavelength window as illustrated in FIG. 5 which shows the wavelength response in the interferometer produced in accordance with the present example, having 100 GHz spacing.

The wavelength range of operation of this Mach-Zehnder is about 33 nm to keep peak isolation to more than 18 dB. To extend the range of operation, one can use different techniques to reduce wavelength sensitivity, such as creating an asymmetry between the fibers by pre-tapering or etching the fibers.

Figure 6:
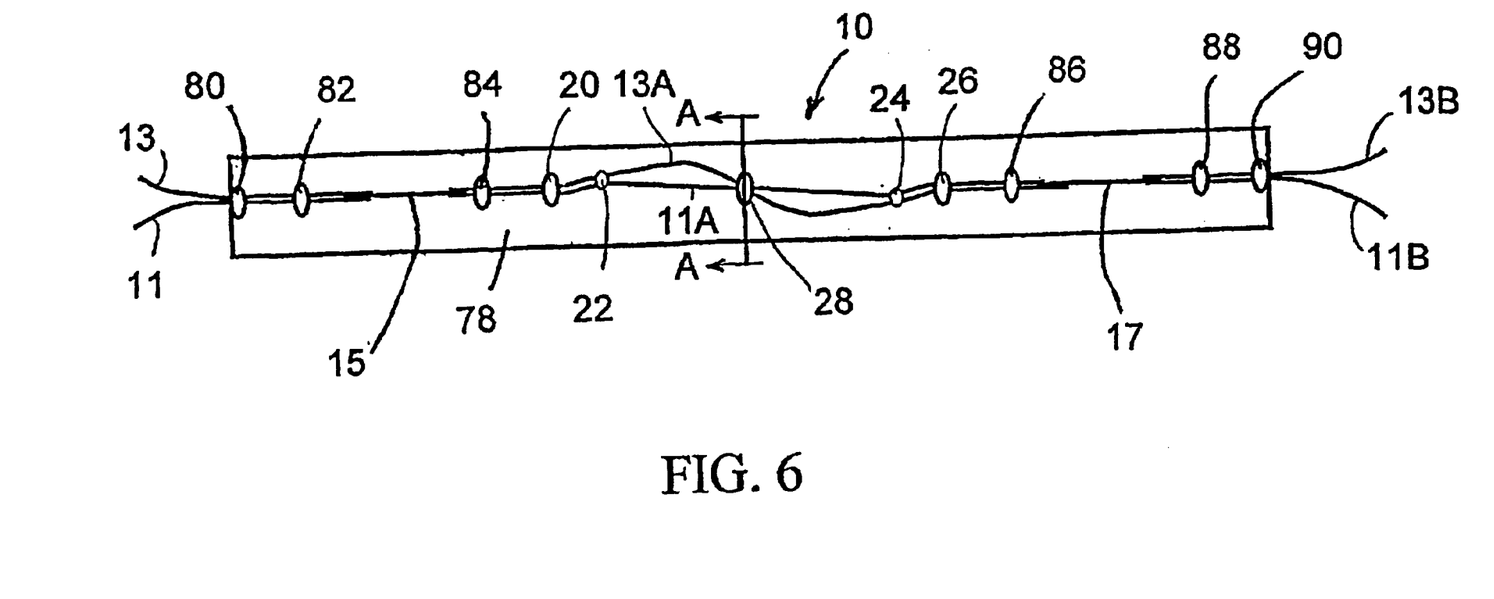
FIG. 6 is a plan view showing an all-fiber Mach-Zehnder interferometer in accordance with the present invention fixed on a supporting substrate.

After stopping the pulling of the second coupler 17 and removing the heat source 48, the Mach-Zehnder interferometer can be packaged. This may be done by removing the fiber alignment blocks 52, 54, 56, 58 and the central tower 44 with mold 46 which holds the S-shaped structure, leaving the Mach-Zehnder suspended in air. Because the S-shape is mechanically stable after it has been secured by bond points, it does not twist or deform the couplers 15, 17. The central fiber structure comprising the S-section is then stripped of its protective jacket so that the latter does not interfere with the proper functioning of the device. Slight tension adjustment may be made on the S-section by pulling the motorized stages 40, 42 to adjust the Mach-Zehnder response to an exact wavelength Once this is achieved, a substrate is approached to the overall structure and is fixed thereto as shown in FIG. 6. Thus, substrate 78 is approached to the overall Mach-Zehnder interferometer structure 10 which is bonded to the substrate by bond points 80, 82, 84, 86, 88 and 90. Normally, there should be at least one bond point 82, 84 and 86, 88 on each side of each coupler 15 and 17 bonding the device to the substrate 78. Two other bond points 80, 90 may be added at each end of the substrate to insure stress relief. Some of the bond points that were initially provided within the central fiber structure, namely 20, 22, 24, 26 and the central point 28 may additionally be bonded to the substrate 78. This can be done for instance, with the middle cross-point bond 28 of the S-shaped section and with bonds 20 and 26. The remainder of the central fiber structure remains in air, i.e. unattached to the substrate 78, so as to minimize both coupling and acoustic waves emanating from the substrate and mechanical tension due to stress induced by thermal expansion coefficient mismatch.

Figure 7:
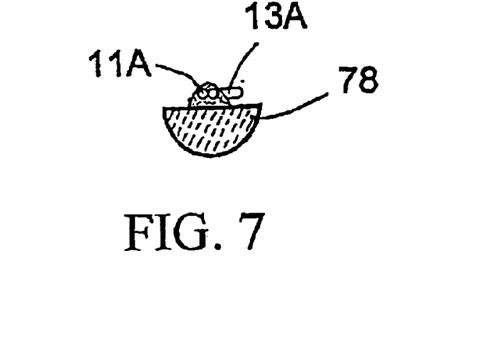
FIG. 7 is a section view across section A—A of FIG. 6.

FIG. 7 shows a section of substrate 78 though line A—A showing that fibers 11A and 13A of the central fiber structure are not touching the substrate 78, but are imbedded in the bonding material and remain above the surface of the substrate. The final structure shown in FIG. 6 and FIG. 7 can be inserted into a protective tube where it is bonded using a flexible material such as silicone, to protect it from vibration and shock.

It should be noted that the present invention is not limited to the specific example described and illustrated herein, but that many modifications obvious to those skilled in the art can be made without departing from the gist of the invention and the scope of the following claims.

What is claimed is:

1. An all-fiber Mach-Zehnder interferometer comprising two fiber optic couplers made in series by fusing and tapering two parallel single-mode fibers, and a central fiber structure between the two fiber optic couplers, said central fiber structure having two fibers of a shape that produces a predetermined path difference required for achieving a desired Mach-Zehnder effect, the fibers of said central fiber structure being of different lengths and being bonded in predetermined spots so as to stabilize the central fiber structure within the interferometer which is bonded to a supporting substrate with bond spots located at least on each side of each coupler.

2. An all-fiber Mach-Zehnder interferometer according to claim 1, in which the fibers of the central fiber structure are bonded to each other in the predetermined spots.

3. An all-fiber Mach-Zehnder interferometer according to claim 1, in which the fibers of said central fiber structure are bonded to the substrate in the predetermined spots so as to maintain mechanical stability of said structure.

4. An all-fiber Mach-Zehnder interferometer according to claim 1, in which the fibers of said central fiber structure are bonded in predetermined spots to one another and also to the substrate so as to maintain mechanical stability of said structure.

5. An all-fiber Mach-Zehnder interferometer according to claim 1, in which the central fiber structure has a shape of a crescent.

6. An all-fiber Mach-Zehnder interferometer according to claim 1, in which the central fiber structure has a shape such that one fiber is straight and the other forms a bump.

7. An all-fiber Mach-Zehnder interferometer according to claim 1, in which the central fiber structure has a shape such that both fibers are outwardly extended with one being more extended than the other.

8. An all-fiber Mach-Zehnder interferometer comprising two fiber optic couplers made in series by fusing and tapering two parallel single-mode fibers, and a central fiber structure between the two fiber optic couplers, said central fiber structure having two fibers of a shape that produces a predetermined path difference required for achieving a desired Mach-Zehnder effect, characterized in that the central fiber structure has a shape such that one fiber is straight and the other is S-shaped with a cross-point between the straight fiber and the S-shaped fiber being essentially in the middle of the structure, and bond spots are provided at each end of the structure and at the cross-point in the middle so as to stabilize the central fiber structure within the interferometer.

9. An all-fiber Mach-Zehnder interferometer comprising two fiber optic couplers made in series by fusing and tapering two parallel single-mode fibers, and a central fiber structure between the two fiber optic couplers, said central fiber structure having two fibers of a shape that produces a predetermined path difference required for achieving a desired Mach-Zehnder effect, characterized in that the central fiber structure has a shape such that one fiber is straight and the other has a shape of a double S with two cross-points on the straight fiber, and bond spots are provided at each end of the structure and at the two cross-points so as to stabilize the central fiber structure within the interferometer.

10. An all-fiber Mach-Zehnder interferometer according to claim 1, in which the two couplers are positioned on approximately the same axis.

11. An all-fiber Mach-Zehnder interferometer according to claim 1, which is a dense or very dense WDM having a large path difference between the fibers in the central fiber structure.

12. Method of manufacturing an all-fiber Mach-Zehnder interferometer which comprises forming a central fiber structure having a predetermined path difference between two single-mode optical fibers of different lengths, bonding the fibers of said structure by means of bond spots at predetermined locations adapted to stabilize said structure said bonding being done after initially unjacketing the fibers only in spots where they are to be bonded, and once the structure is mechanically stable, forming a coupler at each end thereof so as to produce the Mach-Zehnder effect, and fully removing jackets from the fibers of the central fiber structure prior to packaging the interferometer.

13. Method according to claim 12, in which the single-mode optical fibers in the central fiber structure are bonded to each other, or to other supporting fibers or to a substrate in order to achieve mechanical stability.

14. Method of manufacturing an all-fiber Mach-Zehnder interferometer which comprises forming a central fiber structure having a predetermined path difference between two single-mode optical fibers of different lengths by placing the two single-mode optical fibers in channels provided in a mold and having a predetermined configuration for each fiber, bonding the fibers of said structure by means of bond spots at predetermined locations adapted to stabilize said structure, said bonding being done within cavities provided in said configuration at predetermined spots, and once the central fiber structure is mechanically stable, forming a coupler at each end thereof so as to produce the Mach-Zehnder effect.

15. Method according to claim 12, in which the central fiber structure is so formed that input and output fibers on each side thereof are aligned essentially on a same axis and come out parallel to each other, said input and output fibers then being placed in contact with each other and fused and tapered to make a coupler at each end to form the Mach-Zehnder interferometer.

16. Method according to claim 15, in which the two couplers are made sequentially and monitored to achieve the Mach-Zehnder effect.

17. Method of manufacturing an all-fiber Mach-Zehnder interferometer which comprises forming a central fiber structure having a predetermined path difference between two single-mode optical fibers of different lengths, bonding the fibers of said structure by means of bond spots at predetermined locations adapted to stabilize said structure, and once the structure is mechanically stable, forming a coupler at each end thereof so as to produce the Mach-Zehnder effect, and once the central fiber structure and the couplers have been made, the resulting Mach-Zehnder combination is maintained in air due to its mechanical stability and a substrate is approached thereto on which the combination is mounted by bonding it to the substrate at predetermined spots.

18. Method according to claim 17, in which the combination is bonded to the substrate so that the fibers themselves do not touch the substrate, but remain in air above of the substrate, and are in contact with the substrate only at and through the bonding spots.

* * * * *